United States Patent [19]
Chan et al.

[11] Patent Number: 5,883,622
[45] Date of Patent: Mar. 16, 1999

[54] TOUCHPAD PEN-INPUT CONTROLLER

[75] Inventors: Chow Fong Chan; Maisy Mun Lan Ng; Eng Yue Ong; Xia Geng; Swee Hock Alvin Lim, all of Singapore, Singapore

[73] Assignee: Tritech Microelectronics International Ltd., Singapore, Singapore

[21] Appl. No.: 785,738

[22] Filed: Jan. 17, 1997

[51] Int. Cl.[6] .................................................... G09G 5/00
[52] U.S. Cl. .......................... 345/173; 345/174; 345/211
[58] Field of Search .................................. 345/156, 157, 345/173, 174, 175, 211, 212; 178/18, 19

[56] References Cited

U.S. PATENT DOCUMENTS

| | | | |
|---|---|---|---|
| 4,196,358 | 4/1980 | Conover et al. | 307/243 |
| 4,616,325 | 10/1986 | Heckenbach et al. | 364/505 |
| 4,656,585 | 4/1987 | Stephenson | 364/424 |
| 5,150,120 | 9/1992 | Yunus | 341/143 |
| 5,187,481 | 2/1993 | Hiller | 341/131 |
| 5,266,750 | 11/1993 | Yatsuzuka | 178/19 |
| 5,287,121 | 2/1994 | Louis et al. | 345/179 |
| 5,446,371 | 8/1995 | Eccleston et al. | 324/121 |
| 5,508,719 | 4/1996 | Gervais | 345/157 |
| 5,568,409 | 10/1996 | Neoh | 364/702 |

*Primary Examiner*—Matthew Luu
*Attorney, Agent, or Firm*—George O. Saile; Stephen B. Ackerman; Bill Knowles

[57] ABSTRACT

Systems and methods for the detection of motions of a pointed object upon a writing surface such as a touchpad is disclosed. The motions will be detected and converted in a multiplexing analog-to-digital converter to digital codes representing the location of the pointed object and the pressure of the pointed object upon the touchpad. The location and the pressure will be translated into a pen detect signal indicating the presence of the pointed object upon the touchpad. The digital codes will be averaged to minimize noise created by vibrations and variations in the motions of the pointed object held by the human hand and formed into an absolute coordinate digital code. The absolute coordinate digital code, the pressure digital code, and the pen detect signal will be converted to a touchpad-computer interface protocol for transmission to a computer system for further processing. The pen detect signal will be sense to determine if the pointed object has not been in contact with the touchpad for a long period of time and remove power from the circuitry controlling the touchpad. For battery power operations, a battery sense line will be connected to the multiplexing analog-to-digital converter to create a battery power set of digital codes which are manipulated in a battery gauge circuit to create a battery condition set of digital codes which are transmitted to the computer system.

20 Claims, 4 Drawing Sheets

TOUCHPAD PEN-INPUT CONTROLLER

BACKGROUND OF THE INVENTION

1. Field of the Invention

The present invention relates to computer system input devices such as a digitizers referred to as touchpads and more particularly to the systems and methods necessary to acquire signals from such input devices and to convert the acquired signals to digital codes that are transmitted to the computer system.

2. Description of Related Art

Touchpads are small digitizer based devices that are pen input devices to allow a person to write or draw upon the surface of the touchpad and have the signals and codes from a controller to be interpreted by a computer system. The touchpad digitizers may be of three types, capacitive, resistive and electromagnetic.

Referring to FIG. 1, the surface 12 of the touchpad becomes a "writing surface" for capturing the position of an pointed object 10 such as a finger, pen or stylus upon the touchpad. The touchpad signals are analog signals that will be captured by a touchpad interface circuit 28 and translated to digital codes that will be transferred to a computer system 32 on an interface 30. The interface 30 may be an industry standard serial interface, an industry standard parallel interface, or a custom interface requiring special adapter circuitry within the computer system 32 to accept the digital codes from the touchpad interface 28.

An example of a resistive touchpad is shown in FIG. 1. The resistive touchpad is made up of multiple layers of resistive films and protective layers. The protective hard coating 12 is the surface onto which the pointed object 10 is pressed upon during the writing and drawing. A first layer of resistive film 14 is attached to the protective hard coating 12 on the surface opposite the writing surface. This first layer of resistive film forms the Y-plane of the touchpad. Attached to the surface of the Y-plane resistive film 14 opposite the surface attached to the hard protective coating 12 is a second resistive film 16. This second resistive film 16 forms the X-plane of the touchpad. Finally attached to the side of the X-plane resistive film 16 is a supporting back layer 18. This back layer provides protection and mechanical support for the for the X-plane and Y-plane resistive films 14 and 16.

The touchpad interface 28 is connected through the touchpad interface lines 20, 22, 24, and 26. Each line will provide a stimulus such as a current or voltage to the periphery of the X-plane resistive film 16 and the Y-plane resistive film 14. As shown in FIG. 2, as the pointed object 10 is pressed 40 on the touchpad surface 12, the Y-plane resistive film 12 will deform and touch the X-plane resistive film 14. The X-plane resistive film can not deform because it is supported by the supporting back layer 18. This causes the Y-plane resistive film 14 and the X-plane resistive film 16 to come into contact with each other. This will cause a response in the form a change in voltage or current depending upon whether the stimulus from the touchpad interface 28 of FIG. 1 is a constant voltage or a constant current. If the stimulus from the touchpad interface 28 of FIG. 1 is a constant voltage the currents through the touchpad interface lines 20, 22, 24, and 26 will be modified according the position of the pointed object 10 on the touchpad surface 12. However, if the stimulus from the touchpad interface 28 of FIG. 1 is a constant current the voltages between the touchpad interface lines 20, 22, 24, and 26 will be modified according to the position of the pointed object 10 on the touchpad surface 12.

Referring back to FIG. 1, the touchpad interface 28 will have multiple analog to digital converters that will sense the change in the analog responses from the touchpad interface lines 20, 22, 24, and 26 and convert them to digital codes indicating the absolute position of the pointed object 10 upon the touchpad surface 12. The digital codes may be transmitted directly to the computer system across the interface 30 and translated to absolute coordinates within the computer system or the touchpad interface 28 may determine the absolute coordinates and transmit them directly to the computer system 32. For the computer system 32 to use the absolute coordinates generated by the touchpad interface 28 to control the movement of the cursor 36 upon the display screen 34.

Touchpads such as described in FIG. 1 have applications to mobile, portable, or lap top computing systems which are self contained and are powered by a battery power source. The amount of energy remaining in the a battery and the amount of energy consumed by the components of the computer system such as the touchpad and the touchpad interface are factors that must be continuously monitored and regulated to maximize the operation time of these mobile computer systems.

A class of mobile or portable computer systems are known as personal digital assistants. The personal digital assistant uses a touchpad as the primary human input interface. Handwriting must be interpreted to text and drawings to create commands and data to operate the personal digital assistant.

To interpret the hand writing accurately information regarding the pressure of the pen or stylus upon the touchpad and whether the pen is in contact with the touchpad to determine an end of a stroke for the formation of a character. Handwriting interpreting algorithms as currently applied, have only a series of recent history of the absolute coordinates of the location of the pointed object 10 of FIG. 1 upon the touchpad. From these coordinates the handwriting must be interpreted to commands and characters. If the pressure and stroke information is available handwriting interpretation could be more accurate.

U.S. Pat. No. 5,266,750 (Yatsuzuka) discloses a tablet input device and circuitry for providing stimulating voltages to the tablet input device and for sensing the response voltages from the tablet input device when the tablet input device is being pressed. The circuitry provides an OFF state wherein power to the tablet is minimized during a waiting period.

U.S. Pat. No. 5,568,409 (Neoh) assigned to the same assignee as the present invention, discloses a circuit for the implementation of the detection of a pointed object upon a touchpad and technique for the removal of power form the circuitry when the pointed object has not been detected upon the touchpad.

U.S. Pat. No. 5,287,121 (Louis, et al.) discloses a graphics input device where a stylus is used on a mechanism resembling a joy stick to provide horizontal graphics signals to a graphics processor and a feature within the mechanism to sense pressure upon the stylus to generate vertical graphics information.

U.S. Pat. No. 5,508,719 (Gervais) discusses a pressure activated pointing device for mobile or portable computing systems, where the output signals are proportional to the pressure on the pointing device.

The use of multiplexes within an analog-to-digital converter circuit is well known in the art. U.S. Pat. No. 5,446,371 (Eccleston, et al.), U.S. Pat. No. 5,150,120 (Yunus), U.S. Pat. No. 5,187,481 (Hiller), U.S. Pat. No. 4,656,585 (Stephenson), U.S. Pat. No. 4,616,325

(Heckenbach, et al.), and U.S. Pat. No. 4,196,358 (Conover, et al.) describe various applications of analog and digital multiplexing circuits for use within analog-to-digital converters.

SUMMARY OF THE INVENTION

An object of this invention is to provide a battery powered touchpad digitizing device to convert electrical responses to the movements of a pointed object such as a pen, stylus, or finger upon a writing surface to digital codes that indicate the location and the pressure being applied by the pointed object to the writing surface. Another object of this invention is to detect the presence of the pointed object upon the writing surface and to provide a signal indicating such presence. Still another object of this invention is to reduce variation in the digital codes indicating location of the pointed object due to vibration of the pointed object in the human hand. Further another object of this invention is to monitor the energy level of the battery powering the touchpad digitizing device and the computer system attached to the touchpad digitizing device. And still further another object of this invention is to multiplex the monitoring of the battery energy level with the electrical responses from the writing surface to allow the use of a single analog-to-digital converter circuit.

To accomplish these and other objects, a battery powered touchpad digitizing computer input device has a touchpad digitizer with a hard writing surface, a touchpad transducer to convert the movements of the pointed object upon the writing surface to electrical responses indicating the location and pressure of the pointed object upon the writing surface. The electrical response is generated by an electrical stimulus from a touchpad driver circuit connected to the touchpad transducer. A pressure sense circuit will convert the electrical responses from the input transducer to a pressure analog signal that is proportional to the force exerted by the pointed object upon the writing surface.

A multiplexing analog-to-digital converter will receive a plurality of analog signals and convert them to a set of digital codes representing the magnitude of the analog signals. The electrical responses from the touchpad transducer are members of the set of analog signals and are converted to a set of location digital codes describing the location of the pointed object upon the writing surface with respect to the peripheral sides of the touchpad digitizer. The pressure analog signal is another member of the plurality of analog signals and is converted to a set of pressure digital codes representing the level of force upon the writing surface.

The battery powered touchpad digitizing computer input device has a pen detect circuit that will receive the set of location digital codes and the pressure digital codes and create a pen detect signal that indicates that the pointed object is in contact with the writing surface.

A touchpad computer interface is connected to the multiplexing analog-to-digital converter, the pen detect circuit to receive and convert the set of location digital codes, the pressure digital codes, and the pen detect signal to a touchpad interface protocol. The touchpad computer interface will transmit the touchpad interface protocol to the computer system for further processing.

The battery powered touchpad digitizing computer input device further has battery to provide a voltage and a current to the battery powered touchpad digitizing computer input device and to the computer system. The battery has a battery sense line connected to the multiplexing analog-to-digital converter to convert the voltage and current to a set of battery power digital codes. The battery power digital codes are transferred to a battery gauge circuit, which calculates a battery condition set of digital codes indicating a charging state of the battery. The battery condition set of digital codes are transferred to the touchpad computer interface for transmission to the computer system.

A power supply control and regulator circuit is connected to the battery to control and regulate the voltage and current from the battery. An autopower save circuit is connected to the pen detect circuit. The autopower save circuit will sense if the pointed object has not been in contact with the writing surface for a long period of time and send a command to the power supply control and regulator circuit instructing the power supply control and regulator circuit to remove the voltage and current from the battery powered touchpad digitizing computer input device. Power is restored to the battery powered touchpad digitizing computer input device when the pointed object is placed upon the writing surface.

DETAILED DESCRIPTION OF THE INVENTION

Figure 3:
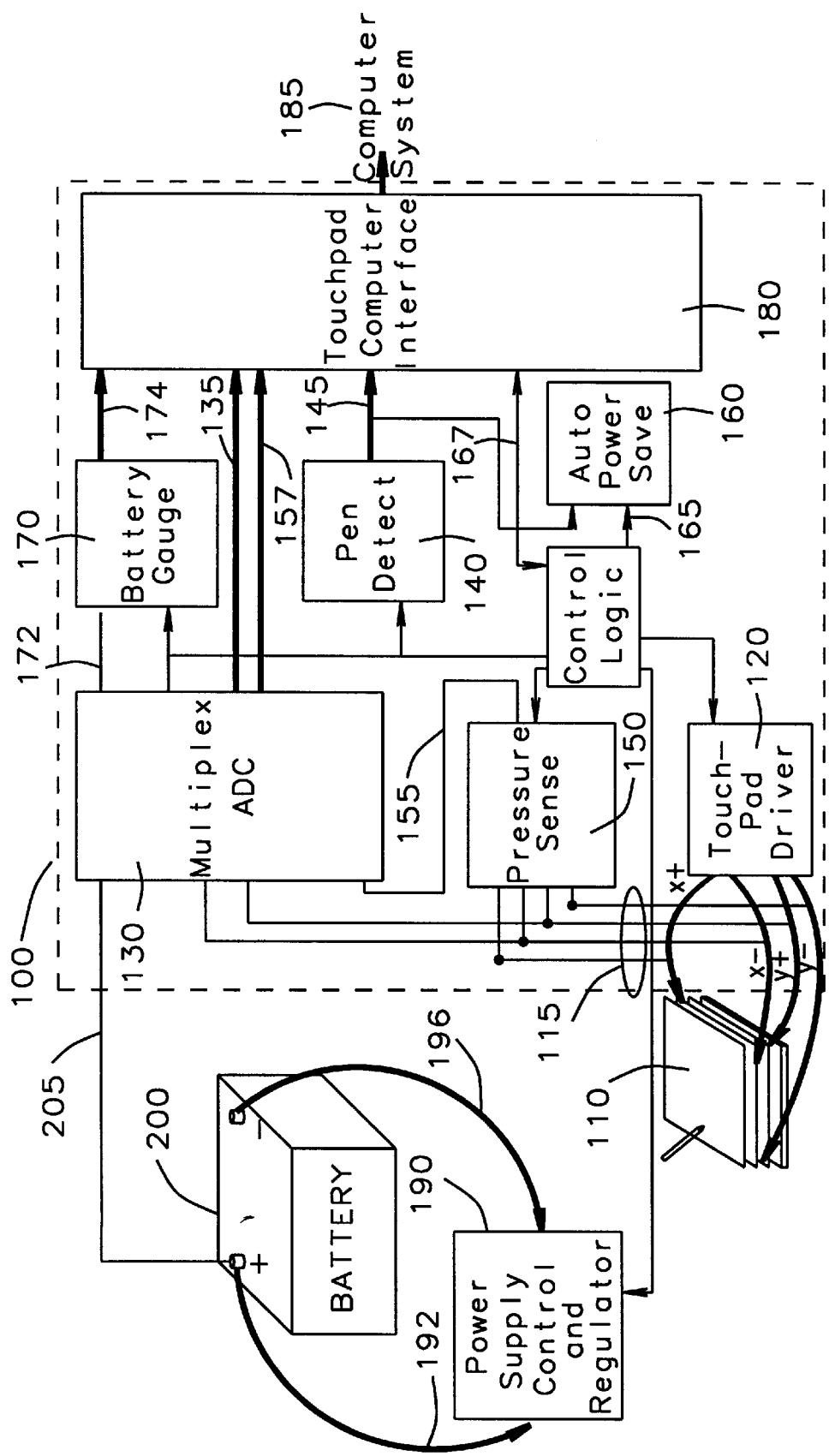
FIG. 3 is a schematic diagram of the battery powered touchpad digitizing control system of this invention.

Referring to FIG. 3 an embodiment of a touchpad pen-input controller 100 has a touchpad driver 120 which will provide a constant current as a stimulus to the touchpad 110. The touchpad driver 120 will provide a constant current source connected to the X+ line that is connected to the X-plane of the touchpad 110 and a constant current sink is connected to the X− line that is connected to the opposite side of the X-plane of the touchpad 110. The touchpad driver 120 will provide a second constant current source connected to the Y+ line that is connected to the Y-plane of the touchpad 110 and a second current sink that is connected to the Y− line that is connected to the Y-plane on the side opposite the connection of the Y+ line. As a pointed object such as a finger, stylus, or pen is moved across the touchpad, the resistance of the resistive film as described in FIG. 1 changes causing the voltage at the current sources connected to the X+ line and Y+ line and at the current sinks connected to the X− line and Y− line to vary. The voltage variation will be proportional to the distance that the contact is from the peripheral edges of the touchpad where the X+ and Y+ lines and the X− and Y− lines are attached.

The voltages present at the connections of the current sinks connected to the X− and Y− lines are coupled 115 to a multiplexing analog-to-digital converter 130. These voltages are converted at regular timing intervals to a set of location digital codes 135 representing the amplitude of the voltages present at the connections of current sinks connected to the X− and Y− lines that indicate the location of the pointed object pressed on the touchpad 110 surface.

The voltages 115 present at the connections of the current sources connected to the X+ and Y+ lines and the current sinks connected to the X− and the Y− lines are also coupled to the pressure sense circuit 150. The pressure sense circuit converts the voltages 115 to an analog pressure signal 155. The pressure sense signal is proportional to the magnitude of the force of the pointed object pressing upon the touchpad 110.

The pressure sense signal is an input to the multiplexing analog-to-digital converter 130 and will convert, at regular timing intervals, the pressure signal to a set of pressure digital codes 157 that represent the magnitude of the pressure sense signal.

Figure 2:
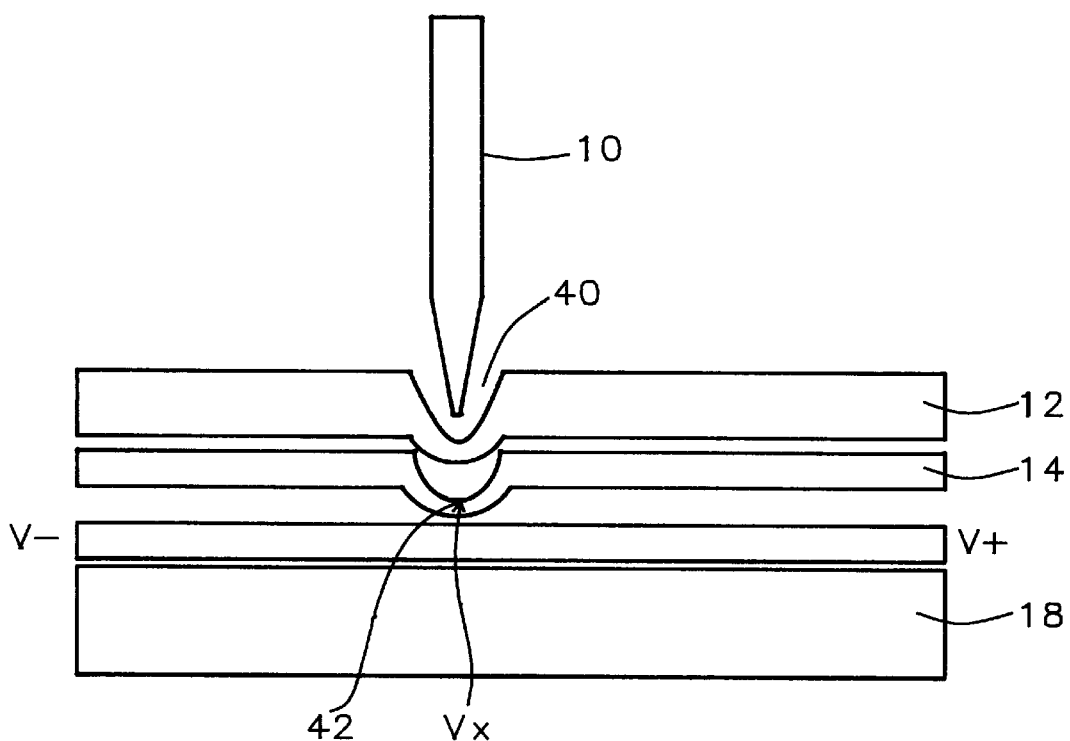
FIG. 2 is a diagram of a resistive film touchpad showing a the location of a pointed object such as a pen or stylus upon the touchpad.

An alternative to developing the analog pressure signal 155 from the change in the voltages 115, is to place a pressure transducer between the X-plane 16 of FIG. 2 of the touchpad 110 and the supporting back layer 18 of FIG. 2. The pressure transducer will provide a direct analog pressure signal and require the pressure sense circuit 150.

The electrical responses at the X– line will be transferred to the pen detect circuit 140 which will set the pen detect signal 145 to a first logic state when a change in the electrical responses at the X– line indicate that there has been a pointed object pressed on the touchpad 110 surface. The pen detect signal 145 will assume a second state when the electrical responses at the X– line indicate that there is no object pressed on the touchpad 110 surface. A circuit for providing the pen detect signal is disclosed in U.S. Pat. No. 5,568,409 (Neoh), is assigned to the same assignee as the present invention, and is included herein by reference.

The location digital codes 135 also are transferred to the touchpad computer interface 180. The touchpad computer interface 180 will average the location digital codes 135 to minimize the effects of rapid variations in the location digital codes 135 due to the fluctuations of the pointed object upon the touchpad 110. The averaged location digital codes are converted to a touchpad computer interface protocol that describes the absolute coordinates of the pointed object upon the touchpad 110.

A description of a representative technique for the averaging of the location digital codes 135 is shown in pending application TMI96-011 (Ong, et al.), Ser No. 08/785,629, filing date Jan. 17, 1997 assigned to the same assignee as the present invention and incorporated herein by reference.

The pressure digital codes 157 are transferred to the touchpad computer interface to be merged to the touchpad interface protocol for transmission to the computer system 185. The averaged location digital codes and the pressure digital codes 157 are joined to form the following code:

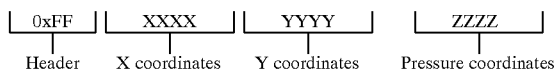

| 0xFF | XXXX | YYYY | ZZZZ |
| Header | X coordinates | Y coordinates | Pressure coordinates |

This code may be transferred on an industry standard serial interface or by any other applicable interface.

The battery (or any other suitable power supply voltage source) 200 has a positive connector 192 and a negative connector 196 to deliver a voltage and current to the touchpad pen-input controller 100 and the computer system 185 through the power supply controller and regulator 190. The battery sense line 205 will sense the voltage and current of the battery 200. The battery sense line is an input of the multiplexing analog-to-digital converter 130. The multiplexing analog-to-digital converter 130. will create a battery power set of digital codes 172 that indicate the magnitude of the voltage and current of the battery 200.

The battery power set of digital codes 172 are transmitted to the battery gauge 170 which calculates a set battery condition digital codes 174. The battery condition digital codes 174 are an indication of the level of energy remaining within the battery 200 and the rate of consumption of the battery 200.

The battery condition digital codes 174 are transferred to the touchpad computer interface 180 to be transmitted to the computer system 185. The computer system will display the battery condition on the display screen to inform the user of the condition of the battery 200. The battery condition digital codes will also be transferred to power supply control and regulator 190 to provide battery condition information.

The autopower save circuit 160 has a timer circuit that will activate a power down signal 165 to the power supply control and regulator circuit 200 to remove the voltage and current from all circuits of the touchpad pen-input controller 100 except the pen detect circuit 140 and the autopower save circuit 160 if no pointed object is detected by the pen detect circuit 140 as being in contact with the touchpad surface 110 for a long period of time. The autopower save circuit 160 will deactivate the power down signal 165 to the power supply control and regulator circuit 200 and the power supply control and regulator circuit 200 will return the voltage and current to the touchpad pen-input controller 100 and will reset the timer circuit within the autopower save circuit 160 when the pen detect signal 145 indicates the pointed object is in contact with the touchpad surface 110. The autopower save circuit 160 will also deactivate the power down signal 165 to the power supply control and regulator circuit 200 and the power supply control and regulator circuit 200 will return the voltage and current to the touchpad pen-input controller 100 and will reset the timer circuit within the autopower save circuit 160 if the computer system 185 activates the touchpad computer interface 180. The autopower save circuit 160 will also transmit a copy of the power down signal through a control bus 167 for transmission to the computer system 185. If the computer system 185 is not actively processing, the computer system 185 will instruct the power supply control and regulator 200 to remove the voltage and current from the touchpad pen-input controller 100 and the computer system 185.

The multiplexing analog-to-digital converter 130 accepts the electrical responses form the touchpad 110, the pressure sense circuit 150, and the battery sense line 205 and with a periodic timing signal converts each signals to the corresponding set of digital codes as described above. Additionally other analog input signals such as microphone input responses to voice signals my be converted to digital codes for transfer to and processing by the computer system.

A multiplexing analog-to-digital converter is described in pending application TMI96-021 (Yue), Ser. No.: 08/785, 735, filing date: Jan. 17,1997, now issued as U.S. Pat. No. 5,736,949, Issue Date Apr. 7, 1998 assigned to the same assignee as the present invention and incorporated herein by reference.

Figure 1:
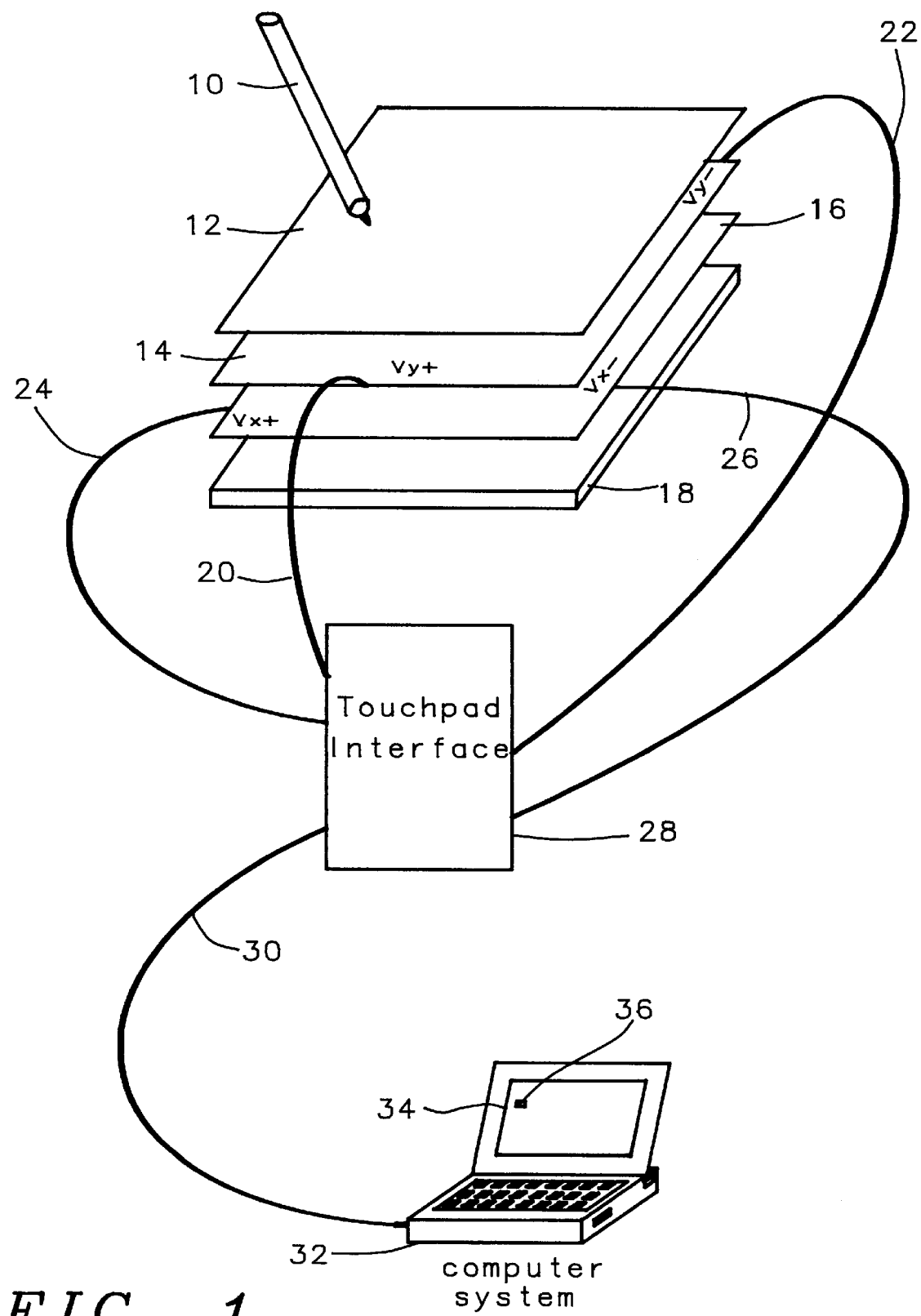
FIG. 1 is an illustration of a resistive film touchpad digitizer as a computer input device.
Figure 4:
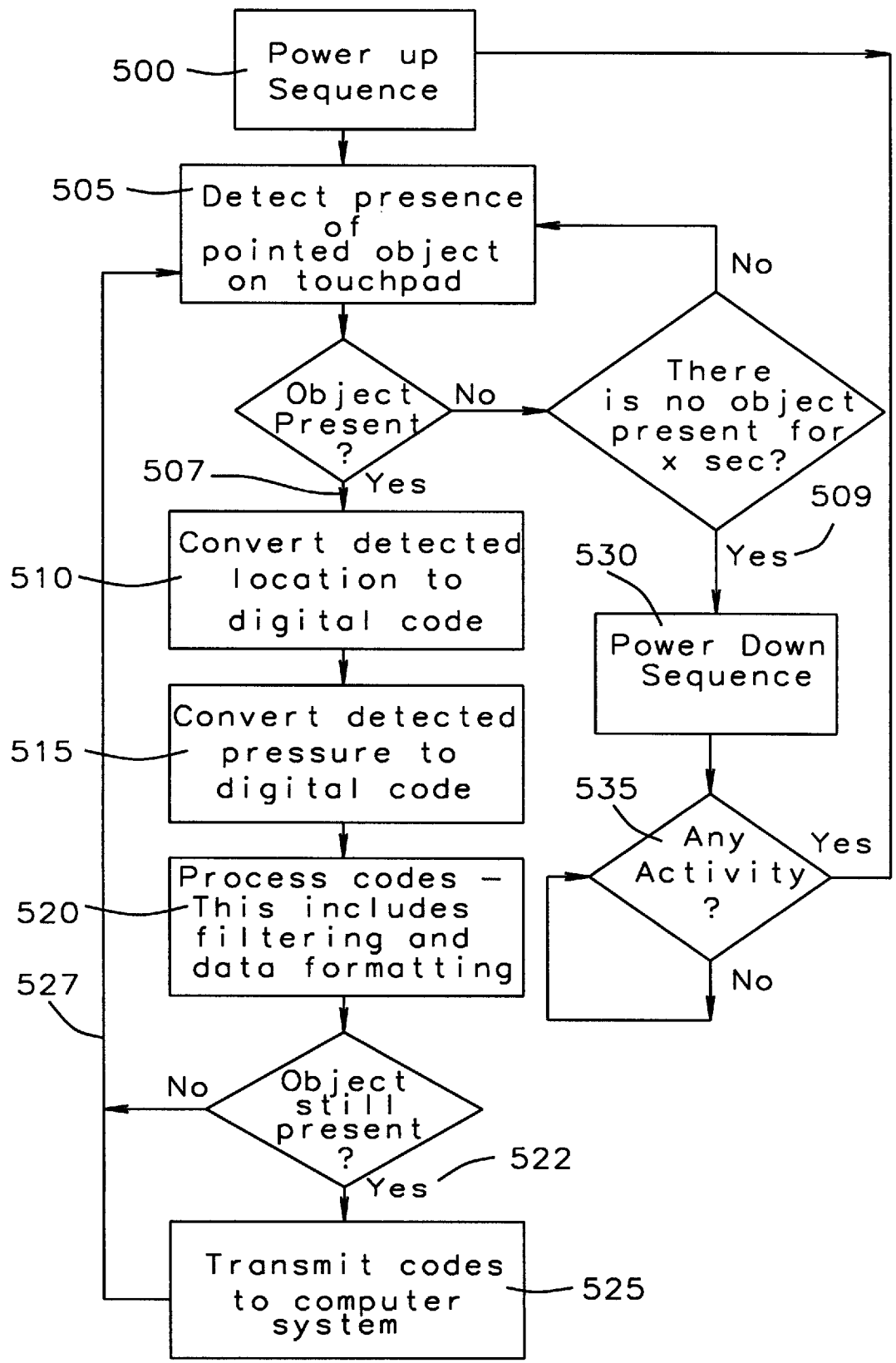
FIG. 4 is a flow chart of the method for the control of a pen-input touchpad computer input device of this invention.

FIG. 4 shows the method to determine the movements of a pen upon a digitizing touchpad as shown in FIG. 1 and transferring digital codes reflecting the movements to a computer system. The steps of the method are as follows:

1. A power down signal is deactivated and electrical power is applied to a touchpad pen-input controller 500.
2. Electrical responses to movements of a pointed object upon the surface of a digitizing touchpad are detected 505.
3. If the object is present on the digitizing touchpad 507, the detected electrical responses to the movements are converted in a multiplexing analog-to-digital converter to a set of location digital codes indicating location of the pointed object upon the surface of the touchpad 510.

4. The detected electrical responses are converted to a pressure sense analog signal 515.

5. The pressure sense analog signal is converted in the multiplexing analog-to-digital converter to a set of pressure digital codes indicating the amount of force the pen is exerting upon the digitizing touchpad surface 520.

6. The pen detect signal, the absolute location digital codes, and the set of pressure digital codes are filtered to remove any noise or extraneous unwanted movements cause by the pointed object moving across the digitizing touchpad and converted to a touchpad-computer interface protocol 520.

7. The touchpad-computer interface protocol is transmitted to the computer system for further processing 525.

8. If the pointed object has not been detected 509 as being present on the digitizing touchpad for a period of time, the power is removed 5530 from the circuitry that will implement this method so as to conserve energy, and whenever the pointed object is detected as touching the touchpad 535 power is restored 570 to the circuitry.

9. If the pointed object has left the surface of the digitizing touchpad or the touchpad interface protocol has been transmitted to the computer system 527, the method returns to step 2 505.

While this invention has been particularly shown and described with reference to the preferred embodiments thereof, it will be understood by those skilled in the art that various changes in form and details may be made without departing from the spirit and scope of the invention.

What is claimed is:

1. A battery powered touchpad digitizing computer input device to detect a presence of a pointed object upon a surface and converting said presence to a set of digital codes that indicate location and force of said pointed object upon said surface, comprising a) a touchpad digitizer having a hard covering surface, a touch input transducer to convert said presence to electrical responses proportional to a distance of said pointed object from peripheral sides of said surface and proportional to the force of said pointed object upon said surface;

b) a touchpad driver circuit connected to said touchpad digitizer to provide an electrical stimulus to said touch input transducer;

c) a pressure sense circuit to convert the electrical responses to a pressure analog signal proportional to said force of the pointed object upon said surface;

d) a multiplexing analog-to-digital converter to accept a plurality of analog signals including the electrical responses and the pressure analog signal, and convert said plurality of analog signals to a plurality of digital codes that include a set of location digital codes representing the location of the pointed object upon the surface and a set of pressure digital codes representing the force of the pointed object upon the surface;

e) a pen detect circuit that receives the electrical responses when said pointed object has been placed upon said touchpad digitizer;

f) a touchpad computer interface connected to the multiplexed analog-to-digital converter and the pen detect circuit to receive and convert the location digital codes, the set of pressure digital codes, and the pen detect signal to a touchpad-computer interface protocol that contains an absolute location and pressure of said pointed object upon said touchpad digitizer and to transmit said protocol to a computer system for further processing, g) a battery to provide a voltage and a current to said touchpad digitizing computer input device and to said computer system, wherein said battery has a battery sense line that is included as one of the plurality of analog signals connected to said multiplexing analog-to-digital converter, and is converted to a set of battery power digital codes indicating the level of the voltage and the current, h) a battery gauge circuit to calculate from the battery power digital codes, a battery condition set of digital codes, which indicates a charging state of said battery, and to transmit said battery condition set of digital codes to the touchpad interface, wherein said touchpad-computer interface will transmit said battery condition set of digital codes to said computer system;

i) a power supply control and regulator circuit connected to said battery to control and regulate the voltage and the current to said battery powered touchpad digitizing computer input device; and j) an autopower save circuit connected to the pen detect circuit to receive the pen detect signal, to interpret said pen detect signal to determine if said pointed object has not been in contact with the touchpad surface for a long period of time, and to create an autopower down signal that will be transferred to the power supply control and regulator circuit to command removal of the voltage and current from said battery powered touchpad digitizing computer input device and to restore said voltage and current if the pen detect signal indicates that the pointed object is in contact with the touchpad surface.

2. The input device of claim 1 wherein the electrical responses varies in magnitude according to the location of said pointed object upon said touchpad.

3. The input device of claim 1 wherein the pointed object is selected from the set of pointed objects including a human finger, a stylus, and a pen.

4. The input device of claim 1 wherein the electrical response selected from the set of electrical responses that include a change in voltage, a change in current, and a change in frequency of an oscillating signal.

5. A touchpad digitizer computer input device control circuit to accept electrical response signals generated by a pointed object in contact with a touchpad digitizer, and to create an absolute coordinate set of digital codes, a pressure magnitude set of digital codes and a pen detect signal for transmission to a computer system for placement of a cursor upon a display screen, to signal an end of stroke in handwriting recognition programs, and to provide stroke, location, and pressure information to signature entry and verification programs, comprising:

a) a touchpad driver circuit connected to said touchpad digitizer to provide an electrical stimulus to said touch input transducer;

b) a pressure sense circuit to convert the electrical responses to a pressure analog signal proportional to said force of the pointed object upon said surface;

c) a multiplexing analog-to-digital converter to accept a plurality of analog signals including the electrical responses and the pressure analog signal, and convert said plurality of analog signals to a plurality of digital codes that include a set of location digital codes representing the location of the pointed object upon the surface and a set of pressure digital codes representing the force of the pointed object upon the surface;

d) a pen detect circuit that receives electrical responses to create a pen detect signal when said pointed object has been placed upon said touchpad digitizer; and e) a touchpad computer interface connected to the multiplexed analog-to-digital converter and the pen detect circuit to receives and converts the location digital codes, the set of pressure digital codes, and the pen detect signal to a touchpad-computer interface protocol that contains an absolute location and pressure of said pointed object upon said touchpad digitizer and to transmit said protocol to a computer system for further processing.

6. The control circuit of claim 5 further comprising a power supply control and regulator circuit connected to a power source to control and regulate the voltage and the current to the touchpad digitizer computer input device control circuit.

7. The control circuit of claim 5 further comprising an autopower save circuit connected to the pen detect circuit to receive the pen detect signal, to interpret said pen detect signal to determine if said pointed object has not been in contact with the touchpad surface for a long period of time, and to create an autopower down signal that will be transferred to the power supply control and regulator circuit to command removal of the voltage and current from the touchpad digitizer computer input device control circuit and to restore said voltage and current if the pen detect signal indicates that the pointed object is in contact with the touchpad surface.

8. The control circuit of claim 5 wherein the plurality of analog signals connected to said multiplexed analog-to-digital converter further comprises a power sense signal connected to the power source that will provide said voltage and current to the touchpad digitizer computer input device control circuit and to the computer system.

9. The control circuit of claim 8 wherein said multiplexed analog-to-digital converter will convert said power sense signal to a set of power digital codes indicating the level of the voltage and the current of said power source.

10. The control circuit of claim 9 further comprising a power gauge circuit to calculate from the power digital codes, a power condition set of digital codes, which indicates a charging state of said power source, and to transmit said power condition set of digital codes to the touchpad interface, wherein said touchpad-computer interface will transmit said power condition set digital codes to said computer systems.

11. The input device of claim 5 wherein the electrical responses varies in magnitude according to the location of said pointed object upon said touchpad.

12. The input device of claim 5 wherein the pointed object is selected from the set of pointed objects including a human finger, a stylus, and a pen.

13. The control circuit of claim 5 wherein the electrical response selected from the set of electrical responses that include a change in voltage, a change in current, and a change in frequency of an oscillating signal.

14. A method to determine movements of a pen upon a surface of a digitizing touchpad and transferring digital codes reflecting the movements to a computer system, comprising the steps of:

a) deactivating a power down signal and reapplying electrical power to a touchpad pen-input controller;

b) detecting electrical responses to movements of a pointed object upon the surface of a digitizing touchpad;

c) if the pointed object is detected upon the surface of the digitizing touchpad, converting the detected electrical responses to the movements in a multiplexing analog-to-digital converter to a set of location digital codes indicating location of the pointed object upon the surface of the touchpad;

d) converting the detected electrical responses to a pressure sense analog signal;

e) converting the pressure sense analog signal in the multiplexing analog-to-digital converter to a set of pressure digital codes indicating the amount of force the pen is exerting upon the digitizing touchpad surface;

f) creating a pen detect signal that indicates the presence of the pointed object upon the surface of the touchpad from the electrical responses;

g) averaging to minimize noise effects to create a set of absolute coordinate digital codes that are a more consistent indication of the movement of the pointed object upon said touchpad digitizer, and forming a set of absolute location digital codes from the location digital codes that indicates the coordinate position of the pointed object upon the digitizing touchpad h) converting the pen detect signal, the absolute location digital codes, and the set of pressure digital codes to a touchpad-computer interface protocol; and i) If the pen detect signal indicates the pointed object is on the surface of the digitizing touchpad, transmitting the touchpad-computer interface protocol to the computer system for further processing.

15. The method of claim 14 further comprising removing of power from the circuitry that will implement this method so as to conserve energy whenever the pointed object has not been detected as being present on the digitizing touchpad for a period of time, and restoring power to the circuitry whenever the pointed object is detected as touching the digitizing touchpad.

16. The method of claim 14 wherein the detecting of the movements is an electrical response from said touchpad created by and electrical stimulus from a touchpad driver.

17. The method of claim 14 wherein the converting of the detected movements is a conversion of the electrical response in a multiplexing analog-to-digital converter to the location set of digital codes.

18. The method of claim 14 wherein the electrical response varies in magnitude according to the location of said pointed object upon said touchpad.

19. The method of claim 14 wherein the electrical response is selected from the set of electrical responses that include a change in voltage, a change in current, and a change in frequency of an oscillating signal.

20. The method of claim 14 wherein the pointed object is selected from the set of pointed objects including a human finger, a stylus, and a pen.

* * * * *